United States Patent [19]

Flusche

[11] 3,998,105
[45] Dec. 21, 1976

[54] TWO AXIS RATE SENSOR

[75] Inventor: David A. Flusche, Garland, Tex.

[73] Assignee: Texas Instruments Incorporated, Dallas, Tex.

[22] Filed: Nov. 29, 1974

[21] Appl. No.: 528,246

[52] U.S. Cl. .................................. 73/505; 73/518
[51] Int. Cl.[2] ...................................... G01C 19/42
[58] Field of Search .................... 73/504, 505, 518; 74/5 F

[56] References Cited
UNITED STATES PATENTS

| | | | |
|---|---|---|---|
| 2,605,093 | 7/1952 | Dorand | 73/516 R |
| 2,716,893 | 9/1955 | Birdsall | 73/504 X |
| 2,974,532 | 3/1961 | Goshen et al. | 73/516 LM |

*Primary Examiner*—James J. Gill
*Attorney, Agent, or Firm*—Harold Levine; Rene E. Grossman; Alva H. Bandy

[57] ABSTRACT

A rate sensor is disclosed comprising a motor driven elastic disk rotor, a light source for illuminating the surface of the disk rotor, a plurality of light detectors mounted on the x or y or both axes of the rate sensor, and a signal processor including a differential amplifier for producing electrical signals representative of the quantity of light detected by the light detectors, the light reflected by the elastic disk is deflected by the disk bending responsive to torque or couple forces applied to the rate sensor and detected by the light detectors to produce electrical signals representative thereof, the electrical signals are coupled to a difference amplifier and dc signals representative of the direction and angular rate of movement of the rate sensor are produced.

7 Claims, 5 Drawing Figures

TWO AXIS RATE SENSOR

This invention relates to angular rate measuring devices and more particularly to a rate sensor for stabilization, control and attitude reference applications.

In the past angular measurements have been measured by rate gyros and rate sensors. A rate gyro consists of a high speed, balanced rotor restrained by a precision spring. The rotor is driven by a synchronous motor and rate information is sensed by a transformer whose reluctance changes as angular distortions of the torsion bar occur. The distortion or twist of the spring is caused by the interaction of the angular momentum of the rotor and any movement of the gyro housing in relation to inertial space. To meet increasing performance requirements, the torsion bar has been replaced by a torquer and a fluid floated inner gimbal with jewel bearings to replace the gimbal ball bearings. A further advance in the art came with the development of gas bearings as substitutes for conventional spin axis ball bearings. The high cost, large size and limited life of the rate gyro led to the development of rate sensors.

Rate sensors have been developed using such new concepts as laser gyros, vibrating beam, vibrating wire, and fluid rotors. Included within the types of rate sensors are two-axis rate sensors. One such sensor includes a motor-driven spinning rotor containing four piezoelectric rotor elements which deflect as the device is exposed to angular rates. The four piezoelectric elements produce an output voltage which is proportional to the angular rate. Another two-axis rate sensor has a motor-driven spinning rotor which contains liquid mercury which circulates through confined channels in the rotor when rates are applied. The mercury, being an electrical conductor, produces a current in a transformer winding as the mercury cuts the magnetic lines of flux which is produced by a second transformer winding. The rotors of these rate sensors are complex in that they contain electrical components inside the spinning rotor and require slip rings to transfer the electrical signals to conditioning electronics located elsewhere in the rate sensor housing.

The existing rate sensors provide many advantages over the rate gyro. Examples of the advantages are: two-axis rate sensitivity, no gimbals, no hysteresis (units will repeat to within the threshold after large input rate excursions), dc output signals, and miniature size. Nevertheless, the existing rate sensors have disadvantages. Examples of the disadvantages are: high speed slip rings, many delicate parts, low vibrations and shock resistance all of which affect their reliability and cost.

Accordingly, it is an object of the invention to provide an inexpensive, rugged subminiature rate sensor.

Another object of the invention is to provide a rate sensor which may be fabricated readily as either a single-axis or two axis rate sensor.

Still another object of the invention is to provide a rate sensor which is of simple construction and with minimum rotating parts.

A further object of the invention is to provide a rate sensor having long life, increased sensitivity and high reliability.

Yet another object of the invention is to provide a rate sensor capable of operating in environmental conditions attending their use in industrial controls, aircraft control display systems, antennas (search mode, slew mode, a tracking mode, antennas (stabilization), helicopter stabilization, fire control systems, and missile and torpedos.

Still yet another object of the invention is to provide a rate sensor which starts instantly, and which is capable of surviving severe shock.

Briefly stated the rate sensor constituting the invention comprises a motor driven rotor which deflects responsive to gyroscopic torque acting upon the rotor. The rotor deflections are measured by non-contacting proximity sensors which produce voltage signals that are proportional either directly or indirectly to the amount of rotor deflection.

The objects and features of the invention will become more readily understood from the following detailed description of the embodiments of the invention when read in conjunction with the drawings in which.

Figure 1:
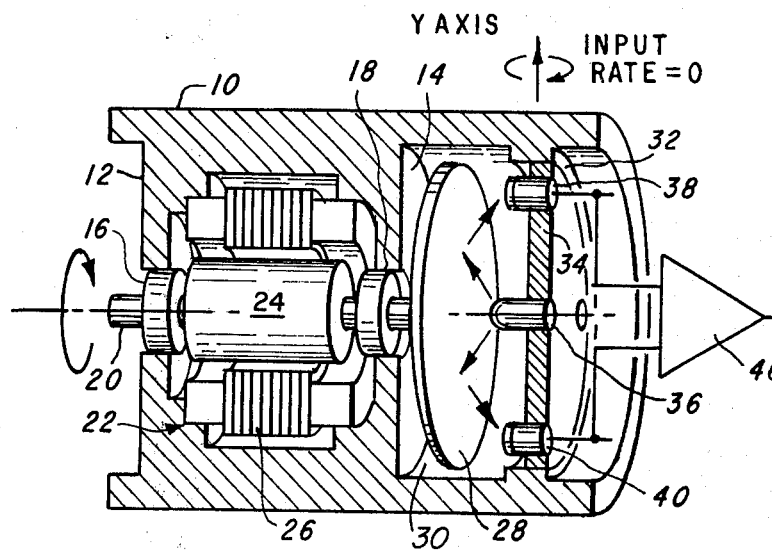
FIG. 1 is a partial cross-sectional view of the embodiment of the rate sensor according to the invention showing the rotor in the null position.

Referring to the drawings, the rate sensor construction of the present invention comprises a tubular housing 10 (FIG. 1) which has a pair of inwardly depending annular flanges 12, 14 in a spaced relation on to the other. The flanges 12 and 14 support respectively ball bearing journals 16 and 18 in which is mounted an armature shaft 20 of an electrical motor 22. The armature 24 and stator 26 of the motor 22 are positioned within the housing 10 between flanges 12 and 14. The motor 22 is a synchronous type motor for driving a rotor 28 rigidly attached to the armature shaft 20 preferably at one end thereof. The rotor 28 is a thin disk constructed from any suitable elastic material such as metal, plastic, or rubber and is contained in compartment 30 of housing 10. Flange 14 forms one end of compartment 30 and an inwardly annularly depending flange 32 supporting a pick-off plate 34 forms the other end.

Figure 2:
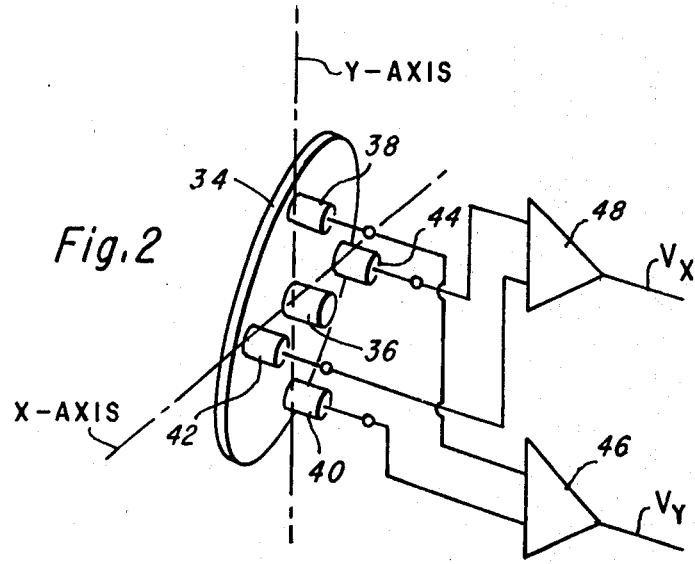
FIG. 2 is a view of the two-axis pickoff configuration of the rate sensor according to the invention.

The pick-off plate 34 includes a light source 36 in axial alignment with the armature shaft 20. The light source 36 illuminates the elastic rotor 28 which reflects light back to the pick-off plate 34. For a single axis rate sensor the pick-offs comprise a pair of light detectors 38 and 40 mounted in the pick-off plate 180° apart on either of the orthogonal $x,y$ axis of the rate sensor depending on the desired angular rate detection. For a two-axis rate sensor (FIG. 2) an additional pair of light detectors 42 and 44 are mounted 180° apart on the pick-off plate 34 and at right angles to the first pair of light detectors 38 and 40. The two pairs of light detectors are mounted on the pick-off plate adjacent the edge of pick-off plate 34 on the $x$ and $y$ axes of the rate sensor. The light detectors produce electrical outputs representative of the amount of reflected light received from the rotor 28 FIG. 1. As shown in FIG. 2, light detectors 38 and 40, mounted on the $y$ axis, have their outputs coupled to differential amplifier 46, and light detectors 42 and 44, mounted on the $x$ axis have their outputs coupled to a differential amplifier 48 for signal processing.

Figure 3:
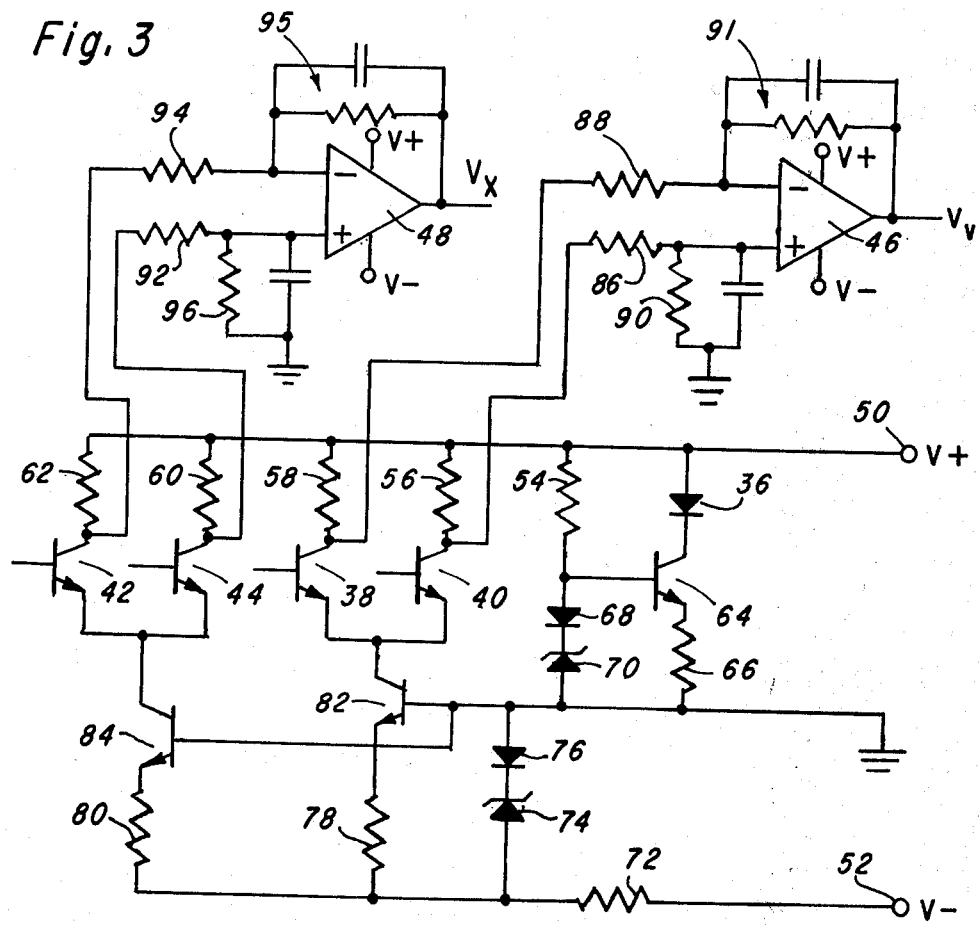
FIG. 3 is a schematic diagram of the signal processor for the rate sensor according to the invention.

For best results a constant light emitting source and a well regulated power source is provided. A suitable system is shown in FIG. 3 in which the light source 36 is a light emitting diode and the light detectors 38, 40, 42 and 44 are phototransistors. The regulated power source for the light emitting diode 36 and phototransistors 38–44 comprises a positive power terminal 50 coupled to a positive power source (not shown) and a negative power terminal 52 coupled to a negative source of power (not shown). The positive terminal 50 is coupled to the anode of the light emitting diode 36, base biasing resistor 54, and collector load resistors 56, 58, 60 and 62. The cathode of the light emitting diode 36 is coupled to the collector of current regulator transistor 64 whose emitter is coupled to emitter load resistor 66 coupled to ground. Base biasing resistor 54 is coupled to the junction of the base of transistor 64 and anode of diode 68. The cathode of diode 68 is coupled to the cathode of zener diode 70 whose anode is coupled to ground. Diode 68 provides the base to emitter drop ($V_{BE}$) and the zener diode with its constant voltage provides a constant voltage drop across resistor 66 which produces constant emitter and collector current in transistor 64 and constant current in light emitting diode 36. The diode 68 has a temperature coefficient equal to that of transistor 64 to provide temperature stabilization. Load resistors 56, 58, 60, and 62 are coupled, respectively, to the collectors of phototransistors 40, 38, 44 and 42. The phototransistors 38–42 have no base leads; the bases are responsive to any light reflected from the rate sensor rotor 28 to create amplified current flow from collectors to emitter.

The negative power terminal 52 is coupled to a negative source of power (not shown) and to a voltage equalizing resistor 72. The resistor 72 is coupled to the junction of a voltage stabilizing zener diode 74 having its cathode coupled to the cathode of diode 76 coupled to ground, and to emitter load resistors 78 and 80 coupled to the emitters of current regulating transistors 82 and 84. The current regulating transistors 82 and 84 have their bases coupled to the temperature stabilizing diode 76 and to ground. The collectors of transistors 82 and 84 are coupled, respectively, to the junctions of the emitters of phototransistors 38 and 40 and the emitters of phototransistors 42 and 44.

The collectors of phototransistors 38 and 40 are coupled, respectively, to the junctions of collector load resistors 56 and 58 and differential amplifier current coupling resistors 86 and 88. Resistor 86 is coupled to the junction of a capactive coupling RC circuit 90 and the positive terminal of the differential comparator amplifier 46. Resistor 88 is coupled to the junction of an RC high bandpass filter feedback loop 91 of the differential comparator amplifier 46 and its negative terminal. RC circuit 90 matches the impedance seen by the positive terminal to that of the RC feedback circuit 91 seen by the negative terminal. The output of the differential comparator amplifier is a dc voltage whose voltage value is proportional to the current differences of the currents generated by phototransducers 38 and 40. The positive or negative dc output represents the angular rate, clockwise or counterclockwise, about the y axis.

The collectors of phototransistors 44 and 42 are coupled, respectively, to the junctions of load coupling resistors 60 and 62 and differential comparator coupling resistors 92 and 94. Differential comparator load coupling resistor 92 is connected to the junction of an RC high bandpass filter circuit 96, and positive terminal of the differential comparator amplifier 48 for coupling the output of phototransistor 44 to the positive terminal without any high frequency noise. Coupling resistor 94 is coupled to the junction of the RC feedback filter circuit 95 of the differential comparator amplifier 48 and its negative terminal. The impedance of RC circuit 95 matches that of RC circuit 96, and the RC circuits remove any high frequency noise from the signals. The voltage of the dc output of the differential comparator amplifier 48 is a proportional measure of the differences of the voltages generated by phototransistors 42 and 44. The positive or negative dc output represents the angular rate, clockwise or counterclockwise, about the x axis of the rate sensor.

In operation the rate sensor housing is attached to the body or frame of the system to be monitored or stabilized, with the motor armature shaft 20 in axial alignment with the housing. The rotor 28 is brought up to speed (24,000rpm) and is illuminated by the light source 36. The rotor being elastic may bend as a result of acceleration of the rate sensor transporting means in the direction of the spin axis. Nevertheless, as the bending force is equally distributed across the rotor surface any resulting distortion of the rotor is equal and the light reflected by the rotor 20 is detected equally by the four dc biased light detectors 38, 40, 42 and 44. Thus, the dc output of the differential comparator amplifiers 46 and 48 are zero.

Figure 5:
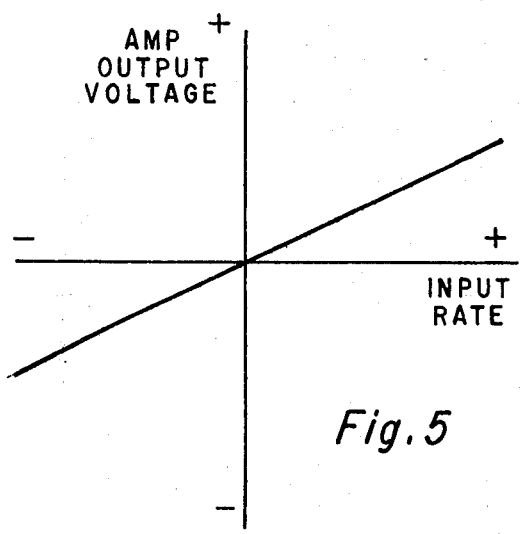
FIG. 5 is plot of the rate sensor input-output signals for either axis.
Figure 4:
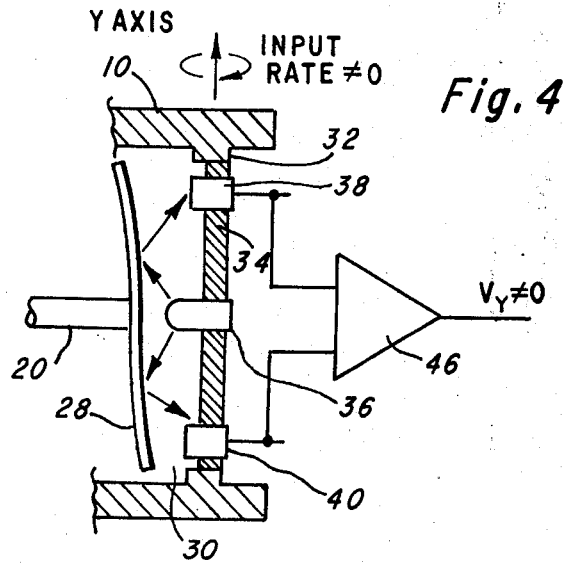
FIG. 4 is a partial cross-sectional view of the rate sensor showing the rotor in the non-null position.

When a torque such as a yaw torque is applied to the housing 10, the rate sensor moves about its y axis causing the rotor 28 to deflect along its x axis (FIG. 4). The amount of deflection is a function of the velocity, or rate of the movement, i.e., the amount of deflection is proportional to the magnitude of the component of the rate vector lying in the plane of the disk 28. Deflection away from a phototransistor increases the amount of optical energy impinging on the phototransistor and deflection towards a phototransistor decreases the amount impinging on the phototransistor. As shown in FIG. 4, the rotation about the y axis is counterclockwise; thus the precession of the elastic rotor is away from photodetector 38 and towards photodetector 40. These changes are the result of the changes of curvature of the elastic rotor as well as the variation of the clearance space between the rotor or disk 28 and the phototransistor lenses. The resultant differential collector voltages are amplified and the output of the amplifier is a positive or negative dc voltage that is proportional to the rate of rotation of the rate sensor about the y axis. Rotation about the y axis in a clockwise direction produces a positive voltage and rotation in the counterclockwise direction produces a negative voltage (FIG. 4). Thus a zero-crossing output voltage verses input housing rate as depicted in FIG. 5 will result.

When a torque such as a pitch torque is applied to the housing of the rate sensor, the rate sensor moves about its x axis and the rotor 28 distorts along its y axis to reflect light proportional to the movement to phototransistors 42 and 44. Again, the amount of deflection is proportional to the magnitude of the component of the rate vector lying in the plane of the disk 28, and the resultant differential collector voltages are amplified and the output of the amplifiers is a positive or negative dc voltage that is proportional to the rate of rotation about the x axis. A positive dc voltage represents a clockwise pitch and a negative dc voltage represents a counterclockwise pitch, thus, a zero crossing output voltage will result. The elasticity of the rotor 28 returns the rotor to its nondeflected position absent such yaw or pitch rates. Thus, rates about two-axis can be measured simultaneously.

Although preferred embodiments of the present invention have been described in detail, it is to be understood that various changes, substitutions, and alterations can be made therein without departing from the scope of invention as defined by the appended claims.

What is claimed is:

1. A rate sensor comprising:
   a. a housing having at least one compartment, said housing adapted for connection to a carrier;
   b. an elastic disk in said at least one compartment, a drive means including a motor and drive shaft coupled to said elastic disk for rotating said elastic disk for producing an angular momentum;
   c. a pick-off means in the at least one compartment of the housing facing the elastic disk, said pick-off means including a light source positioned in axial alignment with the center of the elastic disk for uniformly illuminating the elastic disk when having a non-distorted angular momentum, and a plurality of light sensors mounted in selected spaced relationships to the light source and elastic disk for generating d.c. signals indicative of the light reflected from the elastic disk whereby the interaction of the angular momentum of the elastic disk and movement of the housing in relation to inertial space distorts the elastic disk to vary the light reflected from the elastic disk to the light sensors and the d.c. signals, and
   d. an electrical signal differentiating means responsive to said d.c. signals for producing an electrical signal representative of the movement and rate of rotation of the housing.

2. A rate sensor according to claim 1 wherein said motor is a synchronous motor for rotating the drive shaft at a substantially uniform rate.

3. A rate sensor according to claim 1 wherein the elastic disk is circularly shaped.

4. A rate sensor according to claim 1 wherein the elastic disk is constructed of an elastic material selected from the group consisting of metals, plastics, and rubber.

5. A rate sensor according to claim 1 wherein the light source positioned to illuminate a surface of the elastic disk is a light emitting diode.

6. A rate sensor according to claim 1 wherein the light sensors are phototransistors.

7. A rate sensor according to claim 1 wherein the pick-off means further includes a plate mounted in the at least one compartment wall facing the elastic disk, said light source centrally attached to said plate and said plurality of light sensors mounted in spaced relationships one to another and to the light source on the plate.

* * * * *